United States Patent

Smesny et al.

[11] Patent Number: 5,851,625
[45] Date of Patent: Dec. 22, 1998

[54] ADDITIVE FOR TEXTILE AND ADHESIVE APPLICATIONS

[75] Inventors: Ronald Raymond Smesny, Lafayette; Warren Darius Stidham, Jr., Cohutta, both of Ga.; Paul Graham Barnhardt, Charlotte, N.C.

[73] Assignee: Rhodia Inc., Cranbury, N.J.

[21] Appl. No.: 668,412

[22] Filed: Jun. 21, 1996

Related U.S. Application Data

[63] Continuation-in-part of Ser. No. 374,056, Jan. 19, 1995, abandoned.

[51] Int. Cl.[6] .................................................. D03D 27/00
[52] U.S. Cl. ..................... 428/95; 428/304.4; 428/317.1; 428/317.7
[58] Field of Search ..................................... 524/525, 527, 524/535, 547, 554, 555, 536; 428/95, 304.4, 317.1, 317.7

[56] References Cited

U.S. PATENT DOCUMENTS

| | | | |
|---|---|---|---|
| 3,887,940 | 6/1975 | Mangold et al. | 260/17 R |
| 4,471,082 | 9/1984 | Kwok et al. | 524/46 |
| 4,870,167 | 9/1989 | Zody et al. | 536/114 |
| 5,026,765 | 6/1991 | Hatz et al. | 524/561 |

Primary Examiner—James J. Bell
Attorney, Agent, or Firm—Andrew M. Solomon

[57] ABSTRACT

A composition comprising:
(a) a naturally occurring or synthetic latex; and
(b) a thickening agent comprising one or more polysaccharides;

wherein said thickening agent is present in an amount of between about 0.01 to about 15 parts per 100 parts of polymer in said naturally occurring or synthetic latex and wherein said polysaccharide does not solely comprise a starch or cellulose derivative.

14 Claims, No Drawings

ADDITIVE FOR TEXTILE AND ADHESIVE APPLICATIONS

This is a continuation in part application of U.S. patent application Ser. No. 08/374,056, filed on Jan. 19, 1995, now abandoned.

BACKGROUND OF THE INVENTION

1. Field of the Invention

This invention relates to novel chemical additive materials, a process for preparing these materials and articles containing the materials. More specifically, the materials include as an additive a latex and a polysaccharide thickener.

2. Technology Description

Additive latex based materials are commonly used in multiple applications such as in textile and adhesive products. Typically, such materials include a latex, one or more optional additive materials which provides functional properties such as bulk, flame retardancy, surface wetting, foaming, etc. and a thickening agent. In practice, sodium polyacrylate is used as such as thickener.

While sodium polyacrylate has been widely accepted for industrial use, particularly in the carpet backing industry, it could be further improved. For example, sodium polyacrylate thickeners typically contain methanol as a by-product which may be released when the sodium polyacrylate is reacted during its use. The presence of methanol can potentially cause health hazards. In addition, there are environmental concerns about methanol as result of relatively high volatile organic contents (VOC). Accordingly, it would be ideal if a thickener could be used which does not possess the drawbacks that sodium polyacrylate does.

Abstracts of the following documents suggest that polysaccharides, particularly polygalactomannans may be used in textile or adhesive applications: DE 4137480, Research Disclosure 295077, U.S. Pat. No. 4,870,167, U.S. Pat. No. 4,257,816 and FR 2317311. However, it is not apparently suggested nor disclosed that the polysaccharides may be combined with a latex material to provide a superior composition.

U.S. Pat. No. 4,471,082 discloses a mixture of water based polymer in latex form and a thickening agent. Thickening agents disclosed in this patent include salts of polyacrylic acid, water soluble starch, water soluble cellulose derivatives, alkali-sensitive latexes and mixtures thereof. No suggestion of the use of polygalactomannans is made in this patent.

Despite the above teachings, there still exists a need in the art for novel compositions which include both a latex polymer and a thickening agent which is naturally occurring, environmentally safe, and extremely healthy for human use.

BRIEF SUMMARY OF THE INVENTION

In accordance with the present invention novel compositions are provided which have functionality for a multiple number of uses. More specifically, the compositions comprise:

(a) a naturally occurring or synthetic latex; and
(b) a thickening agent comprising one or more polysaccharides;

wherein said thickening agent is present in an amount of between about 0.01 to about 15 parts per 100 parts of polymer in said naturally occurring or synthetic latex and wherein said polysaccharide does not solely comprise a starch or cellulose derivative.

The compositions preferably are highly viscous liquids which have a viscosity of between about 200 and 60000 centipoises as measured by a Brookfield RV Viscometer and contain between about 30 and about 90 percent solids. In particularly preferred embodiments, the polysaccharide comprises a polygalactomannan, and more preferably guar gum. In still other embodiments the composition further comprises one or more additive materials such as surface active agents, filler materials, cross-linking agents, ultraviolet stabilizers, antioxidants, antiozonates, anti static agents, deodorants, bactericides and the like.

The inventive compositions are synthesized by the method comprising the steps of:

(a) providing a latex material;
(b) optionally adding water to said latex material;
(c) adding a polysaccharide thickening agent in dry or slurry form in the amount of 0.01 to about 15 parts per 100 parts of polymer in said naturally occurring or synthetic latex, wherein said polysaccharide does not solely comprise a starch or cellulose derivative; and
(d) mixing the resulting mixture to yield a highly viscous composition having a viscosity of between 2000 and about 60000 centipoises as measured by a Brookfield RV Viscometer.

In practice, step (d) occurs at ambient conditions and if any additional materials are to be added to the resulting material such as fillers, surface active agents and the like, they are added between steps (b) and (c).

Still another embodiment of the present invention comprises a carpet backing material, unitary backing material, textile coating, textile precoat or adhesive including the above referenced composition. Particularly preferred is the use of the above-defined composition in carpet backing materials and in a foamed state.

Another object of the present invention is to provide novel compositions which demonstrate excellent physical and environmental properties to enable them to be suitable for a number of practical applications.

Still another object of present invention is to provide a process for producing the novel compositions.

A further object of the present invention is to provide a carpet backing material, unitary backing material, textile coating, textile precoat or adhesive including a novel composition.

These, and other objects, will readily be apparent to those skilled in the art as reference is made to the detailed description of the preferred embodiment.

DETAILED DESCRIPTION OF THE PREFERRED EMBODIMENT

In describing the preferred embodiment, certain terminology will be utilized for the sake of clarity. Such terminology is intended to encompass the recited embodiment, as well as all technical equivalents which operate in a similar manner for a similar purpose to achieve a similar result.

The present invention provides novel thickening compositions which have functional uses particularly in textile and adhesive applications.

The first element of the composition is a naturally occurring or synthetic latex. By the term "latex" it is intended to define a polymeric material in an emulsified form, with water being the preferred dispersion medium. Also considered within the scope of the present invention are embodiments wherein the dispersion medium comprises an organic solvent.

The polymer present in latex form is derived from any ethlyenically unsaturated monomer which is capable of polymerizing in an aqueous environment may be selected as a starting material. Particularly preferred are any of the following monomers: acrylic based acids and esters, acrylonitrile, styrene, nitrile containing monomers, divinylbenzene, vinyl acetate, ethylenically unsaturated carboxylic acids, butadiene, acrylamide, methacrylamide, vinylidene chloride and polyvinyl chloride. The emulsion solids that are produced may take the form of homopolymers (i.e., only one type of monomer selected) or copolymers (i.e., mixtures of two or more types of monomer are selected; this specifically includes terpolymers and polymers derived from four or more monomers). Particularly preferred are latexes which include as their polymeric material styrene butadiene, acrylic polymers, ethylene vinyl acetate, ethylene vinyl chloride, modified styrene butadiene polymers and polyvinylidene chloride. Other preferred latex materials include nitrile materials such as acrylonitrile rubbers, acrylonitrile-butadiene rubber, nitrile-butadiene rubbers, NBR and the like. In many cases, the monomer selected is also capable of cross-linking during polymerization.

The second component of the inventive composition is a thickening agent which comprises a polysaccharide material. The polysaccharide material is present in the inventive composition in the amount of 0.01 to about 15 parts per 100 parts of polymer solids in the latex. Even more preferred is the use of between about 0.4 to about 2.0 parts polysaccharide per 100 parts of polymer solids in the latex and even most preferred is the use of between about 0.6 to about 1.2 parts polysaccharide per 100 parts of polymer solids in the latex. The thickening agent is not a starch or cellulose derivative.

Preferred polysaccharides for use are polygalactomannans having a degree of substitution and/or a molar substitution of between about 0 and about 3.0. The polygalactomannans are naturally occurring polysaccharides composed principally of galactose and mannose units and are usually found in the endosperm of leguminous seeds, such as guar, locust bean, honey locust, flame tree, and the like. Guar flour, for example, is composed mostly of a galactomannan which is essentially a straight chain mannan with single membered galactose branches. The mannose units are linked in a 1-4-b-glycosidic linkage and the galactose branching takes place by means of a 1-6 linkage on mannose units in an irregular manner. The ratio of galactose to mannose in the guar polymer is about one to two.

Locust bean gum is also a polygalactomannan gum of similar molecular structure in which the ratio of galactose to mannose is one to four. Guar and locust bean gum are the preferred sources of the polygalactomannans, principally because of the commercial availability thereof.

In use the polygalactomannan may be either in its natural state (i.e., pure guar gum or locust bean gum) or may be derivatized. Derivatized polygalactomannans include one or more non-ionic and/or ionic groups. Examples of the types of functional groups involved in producing the derivatives include hydroxyalkyl groups, carboxyalkyl groups, quaternary ammonium groups, sulfonate groups, cyanoalkyl groups, phosphate groups, siloxane groups and the like having varying degrees of substitution and molecular substitution. Specific examples of such polygalactomannans include glyoxylated guar, hydroxypropyl guar, hydroxyethyl guar, carboxymethyl guar, carboxymethyl hydroxypropyl guar, guar hydroxypropyltrimonium chloride and the like having varying degrees of substitution and molar substitution. Many commercially available starting guar materials may contain small amounts of additives such as borax, surfactants, co-solvents and the like which are present in amounts of less than one percent by weight. These starting materials are expressly intended to constitute part of the present invention.

A particularly preferred guar gum for use in the inventive composition is glyoxylated guar gum. Such material is commercially sold by Rhône-Poulenc Inc. having the trade designation Progacyl PAR. This material includes 99.5 parts of glyoxylated guar gum, between 0.25–0.35 weight percent of decyl alcohol having six moles of ethylene oxide units and 0.–0.25 parts of butyl carbitol.

The term "degree of substitution" as employed herein is the average substitution of functional groups per anhydro sugar unit in the polygalactomannan gums. In guar gum, the basic unit of the polymer consists of two mannose units with a glycosidic linkage and a galactose unit attached to a hydroxyl group of one of the mannose units. On the average, each of the anhydro sugar units contains three available hydroxyl sites. A degree of substitution of three would mean that all of the available hydroxyl sites have been esterified with functional groups.

Similarly, the term "molar substitution" as employed herein is the average number of moles of functional groups per anhydro sugar unit in the polygalactomannan gum.

Alternative polysaccharide materials which may be selected as the starting material include xanthan gum and derivatives thereof. Commercial xanthan products include Rhodopol 23 and Rheozan which are manufactured by Rhône-Poulenc Inc.

Still other polysaccharides which may be selected as a starting material include polydextrose, chitin/chitosan and derivatives thereof, alginate compositions, carageenan gum, pectin, gum karaya and gum arabic.

Also considered within the scope of the present invention is mixtures of polysaccharides such as starches and cellulose derivative materials with the polysaccharides described above, with the proviso that the polysaccharide thickening agent is not solely a starch or cellulose derivative.

Mixtures of the above defined polysaccharides are expressly intended to be incorporated in the present invention.

The polysaccharide used may be in either a naturally occurring or cross-linked state. If it is desired to use a cross-linked material, a small amount of a cross-linking agent as is known in the art may be added to the polysaccharide starting material or the polysaccharide material may be subjected to mechanical means to cross-link it. Examples of cross-linking agents include borate materials such as borax and metal salts such as the salts of zirconium, titanium and aluminum.

In addition, the polysaccharide selected must be hydratable under the pH conditions in which the latex is stable. For example, when using an alkaline stable latex such as a polymer of styrene butadiene in water, the polysaccharide must be alkaline hydratable, i.e., the polysaccharide will hydrate in water at a pH of between 7 and 14, more preferably between 8 to 12. When an alkaline stable latex is selected as the latex component of the inventive composition, glyoxylated guar gum is an excellent choice for the polysaccharide because of its ability to hydrate under alkaline conditions. When an acidic latex is selected for use, the polysaccharide thickening agent must be acid hydratable, i.e., the polysaccharide will hydrate in water at a pH of between 1 and 7, more preferably between 2 to 5. In still other embodiments, the slurried product of the present invention does not necessarily require acid or alkaline hydration to be functional. It may be either neutral hydratable or self hydrating. In many applications, the limiting factor will be boron content in an alkaline medium.

The above paragraph described the inventors' present hypothesis regarding latex applications. It is probable that prehydrated polygalactomannan pastes can also be selected for use as opposed to alkaline or acid hydratable polygalactomannan slurried materials. For example, it is theorized that untreated guar powder could be mechanically dispersed and hydrated without the need of acid or alkaline addition to provide catalysis. In addition, a prehydrated slurry could be obtained which has an acid, alkaline or neutral (i.e., untreated) guar product.

Also optionally present in the inventive composition, is a surface active agent which is added to enable a uniform application of the inventive composition to a substrate. Typically used as the surface active agent is one or more surfactants. In practice the amount of surface active agent added is between 0 to about 5 parts per 100 parts of polymer solids in the latex. The surfactant selected for use is not considered critical to the success of the invention and may be selected from anionic, non-ionic, cationic, amphoteric surfactants and mixtures thereof. Particularly preferred surfactants include one or more anionic surfactants.

The anionic surfactant(s) chosen is not critical and may be any of the known anionic surfactants and is chosen on the basis of compatibility, effectiveness and economy. These anionic surfactants include any of the known hydrophobes attached to a carboxylate, sulfonate, sulfate or phosphate polar, solubilizing group including salts. Salts may be the sodium, potassium, calcium, magnesium, barium, iron, ammonium and amine salts of such surfactants.

Examples of such anionic surfactants include water soluble salts of alkyl benzene sulfonates having between 8 and 22 carbon atoms in the alkyl group, alkyl ether sulfates having between 8 and 22 carbon atoms in the alkyl group, alkali metal, ammonium and alkanolammonium salts or organic sulfuric reaction products having in their molecular structure an alkyl, or alkaryl group containing from 8 to 22 carbon atoms and a sulfonic or sulfuric acid ester group.

Particularly preferred are linear sodium, ammonium and potassium alkyl ether sulfates that are synthesized by sulfating a higher alcohol having between 8 and 18 carbon atoms and having 2 to 9 moles of ethylene oxide. Another preferred anionic surfactant is alkyl benzene sulfonate, in which the alkyl group contains between about 9 to about 15, and even more preferably, between about 11 to about 13 carbon atoms in a straight chain or branched chain configuration and even most preferred a linear straight chain having an average alkyl group of about 11 carbon atoms. Because of their cost and versatility, ammonium or sodium lauryl sulfate are particularly useful surfactants.

Specifically intended to be covered by the claimed invention is associated thickener or surface active agent compositions wherein the polysaccharide in the latex composition has been combined with one or more surface active agents.

Also optionally present in the inventive composition is one or more particulate materials which are added to provide desired physical and/or chemical properties to the final composition. Such properties include providing bulk properties to the final composition, providing a desired feel to the final composition, providing fire retardance, providing cross-linking properties, providing color or pigmentation, providing stabilization against ultraviolet rays and ozone, providing antistatic properties, providing deodorant properties, providing bactericidal properties, providing heat resistance, providing sound deadening and heat and sound insulation.

Examples of such particulate materials include aluminum oxide, calcium carbonate, naturally occurring or synthetic clays, diatomaceous earth, fly ash, titanium dioxide, melamine formaldehyde resins, carbon black and other pigments, barium sulfate, antimony oxide, decabromodiphenyl oxide (sold under the trade name Decabrom), hexabromodiphenyl oxide (sold under the trade name Hexabrom) and the like. These additives are considered to be well within the skill in the art and any traditional used material in textile or adhesive materials is considered to be encompassed by the present invention.

In practice, these optional additives are added in amounts ranging from about 0 to about 1000 parts per 100 parts of polymer solids in the latex.

The final component of the inventive composition is water. Water, if needed, is added to the mixture to yield a composition having between about 30 and about 90 percent solids. In practice, it is preferred to add water such that the amount of solids ranges between about 50 and about 85 percent and even more preferred is to add water such that the amount of solids ranges between about 75 and about 85 percent. Water may already be present in the composition via the latex. It is deemed well within the skill in the art to add water so that a composition having a desired level of solids is produced.

To produce the compositions of the present invention, the latex is first provided. Thereafter, water, as calculated to produce a composition having the desired level of solids is added to the latex. Thereafter, the optional particulate materials are added, followed by the adhesive polysaccharide. The mixture is mixed at ambient conditions for a sufficient amount of time to yield a homogeneous solution. Typical mixing rates and times range from about 30 to about 200 rpm for a time period of about 5 minutes to about one hour. As would readily be understood by those skilled in the art, when materials are selected which create extremely high viscosities higher mixing rates and times may be selected.

The polysaccharide thickener may be added to the composition in either a dry state, prehydrated state or slurried form. When added in slurry form, it is preferably added as an aqueous slurry, having a percent of solids in the slurry ranging from about 5 to about 30 percent, with an amount of 10 percent being particularly preferred, wherein the solids represent the percent by weight of polysaccharide in the polysaccharide/water slurry added to the latex.

The resulting compositions have a variety of desired properties such as ability to be foamed, thickening ability, low VOC, ability to penetrate fibers and other substrates, adhesiveness, desired feel and dimensional stability when applied to a substrate. Even more specifically, the presence of the polysaccharide thickener in the resulting composition is able to provide the following benefits: stabilize the remaining components of the resulting composition (e.g., filler material in dispersion form), improve froth-rate of composition upon application, providing body to enable the resulting composition to be used in a foam machine, improved rheology, improved application efficiency and improved appearance in processing.

Once the novel composition has been synthesized, it may be used in a variety of applications. More particularly, the following uses are contemplated: carpet or other textile backing material, unitary backing material, textile coating, textile precoat or adhesive. When used in any of these above applications, the composition of the present invention may be used per se, or may be combined with other compositions having desired functional uses which would readily be understood by those skilled in the art.

A preferred use of the inventive compositions is in carpet backing materials. Such backing materials can take the form of primary (unitary) backing materials wherein once coated, the composition of the present invention functions as the backing which directly contacts the floor surface, or in multiple layer backing materials, where the inventive composition forms an intermediate layer upon which the primary coating which contains the tufted fibers is laminated to the secondary backing that ultimately contacts the floor surface. The unitary application is particularly preferred for commercial grade carpeting whereas the multi-layer embodiment backing is preferred for residential uses. When used for such unitary or multiple layer backing materials, the inventive compositions may be foamed if desired.

For example, when using the inventive composition in a multiple layer carpet backing, the viscous liquid composition, in either a foamed or nonfoamed state is applied to the backside of the carpet fibers (i.e., the primary backing). Foaming is typically accomplished by injecting air in a closed rotating chamber into the inventive composition. Foaming machines which may be used include Texacote and Oakes type machines and are similar to those used for making foamed breads and marshmallows, or by other methods which would be considered well within the skill of the art. Application of the composition in either its non-foamed or foamed state is preferably accomplished by using a transverse coater. Alternative means for coating the composition onto the primary backing of the carpet can be by pan coating, application through a hose, manifold application or other means as would be well known by those skilled in the art. Once the inventive composition has been coated onto the primary backing layer of the carpet, the secondary backing layer which will ultimately be in contact with the floor surface is laminated to the inventive adhesive composition. Thereafter, the entire laminate is dried and cured.

Tufted carpets need to have a backing applied to lock in the tufts and provide dimensional stability. For cost purposes it would be desirable to put the lowest amount of backing on the fibers to produce a satisfactory product. This leads to diluting the compound. There is a limit to how much water can be used for this so the preferred technique is to dilute the compound with air to thereby form a foam. After foaming, the compound is applied to the carpet, the foam is crushed and, if present, the backing is dried.

Prior art carpet compounds comprise a filler, binder (latex), and a thickener, typically polyacrylic acid. When the compound is foamed the foam must have a certain viscosity and stability and also wet out the carpet to achieve the right strength properties. When polyacrylic acid is used as a thickener there is a limit to how much air can be incorporated in the foam before stability and wetting properties are lost. Therefore there is a limit to how low a coat weight can be put on the carpet. The use of the inventive thickening agent enables the achieving of a lower foam density. This causes a lower coating weight to be applied to the fibers while still maintaining foam viscosity and stability. The performance of the final coating is comparable to the polyacrylic containing compound, but at a lower coat weight and therefore a lower cost.

Conventionally carpet compounds comprise a filler, binder (latex), and a thickener, typically polyacrylic acid. When the compound is foamed the foam must have a certain viscosity and stability and also wet out the carpet to achieve the right strength properties. Those strength properties are specifically targeted for dimensional stability of the carpet, binding of the carpet tufts, and providing adequate delamination strength to the secondary backing of the carpet bundle. These strength properties are directly related to the compound coating applied to the carpet backing. The amount of compound applied (coating weight) is critical to achieving acceptable finished product. The critical structural specifications for the finished carpet henge on tuft bind and/or delamination results. When polyacrylic acid is used as a thickener there is a limit to how much air can be incorporated in the foam or, in other words, how light the cup weight (a universal measuring parameter) can be before stability and wetting properties are lost. This cup weight determination is an indication of how much carpet compound will be applied to the back of the carpet. There is a limit to how low a coat weight can go before the structural integrity (tuft bind and delamination) of the finished product is jeopardized. With the polyacrylic systems in use today, carpet mills have established these low-end limits on coating weights but each is dependent upon a number of variables including but not limited to fiber type, method of construction, type of latex, filler, etc.

Surprisingly, we have found that the use of the inventive thickening agent has allowed for reductions in the cup weights and coating weights of the carpet compounds used as backing for carpet. We have seen reductions from 5–15% in the coating weights yielding equal, if not superior, delamination results as compared to prior backing materials using polyacrylate thickeners (i.e., one can use about 85 to about 95 percent by weight of material as compared to compositions using polyacrylate thickeners). For example, when using standard nylon type 6 and 6,6 fiber in the manufacture of a 1 foot by 1 foot sample of low-cut, plush pile carpet, the coating weight can be reduced to between about 20 and about 22.5 grams as compared with a prior art system using a polyacrylate thickener, which requires at least 23.5 gram amount. Delamination testing occurs using ASTM test method D3936. A value of greater than 3.5 is considered acceptable, with values greater than 4.0 being particularly desirable. The inventive materials exceed this 3.5 value.

When used as a unitary backing, the inventive composition is directly applied to the backside of the carpet as described above in either a foamed or non-foamed state. It is then dried and cured.

The inventive composition also has functionality as a textile precoat. When used in such an application, the composition, optionally in a foamed state, is applied to one surface of the textile material. Thereafter another backing material is applied to the surface of the inventive composition which is not in contact with the textile base, by lamination, overcoating and the like. Such a use is particularly useful for decorative textile applications such as draperies, fabric shades, blinds and the like.

In addition, the inventive composition can also be used as a treatment to provide desired physical or chemical properties to a textile. Such properties would include feel, stability, appearance, flame retardancy, bulk, and the like. A particularly important feature of the inventive composition is its ability to fill in air and water voids of the base substrate. This property both can provide improvements in the resulting material by having both improved appearance as the appearance would be unitary and time stability, as the probability of material failure as a result of the voids would be minimized.

The inventive composition may also be used as a commercial adhesive additive. As is well known, commercial adhesives often suffer by having a large number of fibrous strands which appear during the coating process. Such strands can be problematical in that they can prevent a uniform application of the adhesive to the substrate. When adding the inventive composition to adhesive formulations in an amount of about 0.01 to about 15 parts inventive composition to 100 parts adhesive, the fibrous strands are eliminated.

The inventive composition may also be used for home and automotive upholstery applications. The invention is described in greater detail by the following non-limiting examples.

EXAMPLE 1

50.24 parts of water are added to 192.31 parts of a 58% styrene butadiene latex (solids is 100 parts). Thereafter, 575 parts of calcium carbonate and 5.50 parts of ammonium lauryl sulfate surface active agent (solids is 1.65 parts) are added to the mixture. A solution of 1 part of Progacyl PAR, (Rhône-Poulenc Inc.) which constitutes by weight percent 99.5 percent glyoxylated guar gum, 0.25–0.35 percent decyl alcohol (6 moles ethylene oxide) and 0–0.25 butyl carbitol in 9 parts of water (total amount of solution is 10 parts) is added to the mixture and the mixture is agitated at ambient temperatures at a shear rate of 100 rpm for 10 minutes. This composition has a solids level of about 82% and a viscosity of between about 10,000 to about 20,000 cps as measured by a Brookfield RV Viscometer (Spindle #5, 20 rpm).

To demonstrate the use of the inventive composition as a carpet backing, this compound is first foamed by pumping it into the foam head of a Texacote Head of a Texacote foaming machine. The Texacote head in cross section is a cylinder having circumferentially mounted pins mounted at the outer portions of the interior wall and projecting radially towards the center of the head. There is a rotor inside the head which is star shaped and has pins which are staggered so that they do not contact each other as the rotor spins inside the outer body or stator of the foaming machine. Air is injected under pressure which is higher than the backpressure to the head to foam the latex material. The foamed latex composition is forced through a pipe in the front of the foaming machine into a flexible (Tygon type) hose and the hose is routed to the application point.

The inventive foamed latex composition is then applied to the primary backing of tufted carpet fibers by application through the hose on a traverse. Application occurs at ambient temperatures and the latex is applied to the backing to yield a coating thickness ranging from the lowest possible gauge possible without damaging the fabric up to ½ inch. In practice, the thickness selected is less than ¼ inch. Usually there is a roller or bar across the width of the fabric which can be raised or lowered to control the gauge of foam applied. The carpet, including primary backing is stretched onto a tenter throughout the entire coating and drying process. After application of the inventive material, which typically takes place at ambient temperatures, a secondary backing material, polypropylene (ActionBack brand), is married or joined to the wet inventive composition by press rollers. The entire laminate then travels into a heated oven where the latex composition is dried. The drying temperature and residence time are selected to yield a desirable final product and are interrelated concepts. The drying temperature selected is usually between about 250° F. to about 400° F. The temperature selected must be high enough to dry the water from the compound but not so high as to damage the yarn or backing. The entire process runs on a continuous basis and the carpet travels at speeds from about 20 feet per minute to about 160 feet per minute during processing. When selecting larger sized ovens for drying, faster processing speeds may be selected.

TESTING DATA

A direct comparison is made using this inventive composition as a foamed carpet backing material as compared to a prior art composition which uses a polyacrylate thickener. The fibers which are tested are standard nylon type 6 and 6,6 fibers used in the manufacture of low-cut, plush pile carpet. The amount of fibers which are adhered are a one foot by one foot sample. The delamination is determined by ASTM Standard Test 3936 and cup and coating weight values for the respective compositions are as follows:

| Prior Art Polyacrylic system | | | |
|---|---|---|---|
| | cup weights (gm) | delamination | coating weight (gm) |
| Historical data | 120 | 4.4 | 25.8 |
| | 120 | 4.2 | 23.6 |
| | 120 | 2.5 | 22.1 |
| | 120 | 4.8 | 25.3 |
| | 120 | 4.2 | 25.2 |
| | 120 | 4.9 | 22.6 |
| | 120 | 4.2 | 21.7 |
| | 120 | 4.3 | 22.3 |
| | 120 | 4.3 | 23.5 |
| Average | 120 | 4.2 | 23.6 |

| Composition 1 (Guar based system) | | | |
|---|---|---|---|
| 124 (3% increase) | 4.5 | 26.3 | |
| | 4.6 | 25.9 | |
| | 4.8 | 26.7 | |
| Average | 4.6 | 26.3 | 14.3% increase |
| 115 (4% decrease) | 4.7 | 22.4 | |
| | 2.5* | 22.8 | |
| | 4.4 | 21.8 | |
| Average | 3.9 | 22.3 | 5.5% decrease |
| 102 (15% decrease) | 4.2 | 19.3 | |
| | 4.1 | 20.6 | |
| | 4.0 | 21.5 | |
| Average | 4.1 | 20.5 | 10.8% decrease |

*The 2.5 delamination is considered by the carpet manufacturing facility to be an aberration but is used in calculations. The delamination values are considered very acceptable
Note:
Performance parameters verses the polyacrylic is essentially identical.

The reduction of coating weight while maintaining similar performance by using the inventive composition as compared to the prior art polyacrylate thickened system enables less thickener to be used in coating. This results in less material being used as a backing, causing significant cost savings to the carpet manufacturer.

In addition, the composition of Example 1 functions to adhere the tufted fibers, penetrate the fibers and bind each tuft to prevent fuzzing, adheres to the secondary backing and provides dimensional stability. The presence of the polygalactomannan thickener functions to stabilize the filler dispersion, and improves the rheology of the coating composition. A further consideration when producing multilayer backing materials is to maintain control over the weight of the latex which is applied to the primary backing. Because of the presence of the polysaccharide in the latex the inventive composition is extremely easy to control and as such can allow the users to reduce the amount of latex used, resulting in cost savings. In addition, because of the low VOC associated with the polysaccharide thickener as compared to polyacrylate thickeners, the inventive composition is considered an ideal commercial candidate as it is naturally thickened and environmentally friendly.

Having described the invention in detail and by reference to the preferred embodiments thereof, it will be apparent that modifications and variations are possible without departing from the scope of the appended claims.

What is claimed is:

1. An article of manufacture comprising a carpet backing material, unitary backing material, textile coating, textile precoat or adhesive including a composition comprising:

(a) a material selected from the group consisting of a naturally occurring latex and a synthetic latex; and (b) a thickening agent comprising a polygalactomannan; wherein said thickening agent is present in an amount of between about 0.01 to about 15 parts per 100 parts of polymer in said naturally occurring or synthetic latex, said article being in a foamed state.

2. The article according to claim 1 which is a carpet backing material.

3. The article according to claim 1 wherein said polygalactomannan comprises guar gum.

4. The article according to claim 3 wherein said guar gum is acid hydratable, alkaline hydratable, neutral hydratable, in a prehydrated form or self hydrating.

5. The article according to claim 3 wherein said guar gum is derivatized.

6. The article according to claim 5 wherein said guar gum comprises glyoxylated guar gum.

7. The article according to claim 1 wherein said composition further comprises additives selected from the group consisting of surface active agents, particulate materials and mixtures thereof.

8. The article according to claim 1 wherein the polymer of said latex is derived from an ethlyenically unsaturated monomer which is capable of polymerizing in an aqueous or organic environment.

9. The article according to claim 8 wherein the polymer of said latex is selected from the group consisting of styrene butadiene, acrylic polymers, ethylene vinyl acetate, ethylene vinyl chloride, modified styrene butadiene polymers and polyvinylidene chloride and mixtures thereof.

10. The article according to claim 9 wherein the polymer of said latex is styrene butadiene.

11. The article according to claim 1 wherein the delamination of the foam when adhered to nylon 6, or nylon 6,6 fibers used in the manufacture of low-cut, plush pile carpet as measured by ASTM Standard test method 3936 is at least 3.5.

12. The article according to claim 1 wherein the coating weight of said foam is about 85 to about 95 percent by weight of the foam required when using a composition containing a polyacrylate thickening agent.

13. The article according to claim 1 wherein the coating weight of said foam is between about 20 and about 22.5 grams when applied to a one foot by one foot sample of nylon 6, or nylon 6,6 fibers used in the manufacture of low-cut, plush pile carpet.

14. An article of manufacture comprising a carpet backing material, unitary backing material, textile coating, textile precoat or adhesive including a composition consisting essentially of:

(a) a styrene butadiene;

(b) a particulate filler; and (c) a thickening agent comprising a polygalactomannan; wherein said thickening agent is present in an amount of between about 0.01 to about 15 parts per 100 parts of polymer in said naturally occurring or synthetic latex and wherein said article of manufacture is in a foamed state.

* * * * *